United States Patent
Mao et al.

(10) Patent No.: US 11,240,374 B2
(45) Date of Patent: Feb. 1, 2022

(54) CALL PROCESSING METHOD AND APPARATUS, SERVER, STORAGE MEDIUM, AND SYSTEM

(71) Applicant: HUAWEI TECHNOLOGIES CO., LTD., Guangdong (CN)

(72) Inventors: Guofeng Mao, Hangzhou (CN); Rongguo Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/996,309

(22) Filed: Aug. 18, 2020

(65) Prior Publication Data
US 2020/0382634 A1 Dec. 3, 2020

Related U.S. Application Data

(63) Continuation of application No. PCT/CN2019/082667, filed on Apr. 15, 2019.

(30) Foreign Application Priority Data

Apr. 16, 2018 (CN) .......................... 201810339746.3

(51) Int. Cl.
*H04M 3/22* (2006.01)
*H04M 3/42* (2006.01)
(Continued)

(52) U.S. Cl.
CPC ........... *H04M 3/4217* (2013.01); *H04M 3/20* (2013.01); *H04M 3/2218* (2013.01);
(Continued)

(58) Field of Classification Search
CPC ............ H04M 3/4217; H04M 3/2218; H04M 3/2227; H04M 3/4365; H04M 2203/401
See application file for complete search history.

(56) References Cited

U.S. PATENT DOCUMENTS

6,192,057 B1 2/2001 Dueck et al.
7,395,187 B2 * 7/2008 Duyanovich ....... G06F 11/3409
702/183
(Continued)

FOREIGN PATENT DOCUMENTS

CN 102789496 A 11/2012
CN 103795877 A 5/2014
(Continued)

OTHER PUBLICATIONS

Extended European Search Report dated Feb. 22, 2021, issued in EP Application No. 19788374.7, 8 pages.
(Continued)

*Primary Examiner* — Ahmad F. Matar
*Assistant Examiner* — Jirapon Intavong

(57) ABSTRACT

Example embodiments of this disclosure provide a method, an apparatus, a server, a storage medium, and a system for call processing. The method includes: monitoring, in real time, a call processing process of an artificial intelligence AI robot, to obtain an interaction text of the call, where the interaction text includes a recognition result of a user question and a reply to the user question; obtaining a service level value of the AI robot for the call based on the obtained interaction text; and when the service level value meets a first condition, performing an intervention operation on the call by using a target agent device.

22 Claims, 10 Drawing Sheets

(51) Int. Cl.
*H04M 3/20* (2006.01)
*H04M 3/436* (2006.01)

(52) U.S. Cl.
CPC ....... *H04M 3/2227* (2013.01); *H04M 3/4365* (2013.01); *H04M 2203/401* (2013.01)

(56) References Cited

U.S. PATENT DOCUMENTS

| | | | |
|---|---|---|---|
| 9,860,381 | B1 | 1/2018 | Witt-Ehsani et al. |
| 2003/0018531 | A1 | 1/2003 | Mahaffy et al. |
| 2010/0124325 | A1* | 5/2010 | Weng ...................... G10L 15/22 379/265.11 |
| 2017/0163807 | A1* | 6/2017 | Kumar ................ H04M 3/5232 |
| 2017/0358296 | A1 | 12/2017 | Segalis et al. |

FOREIGN PATENT DOCUMENTS

| | | | |
|---|---|---|---|
| CN | 105563484 | A | 5/2016 |
| CN | 105577529 | A | 5/2016 |
| CN | 105592237 | A | 5/2016 |
| CN | 105701088 | A | 6/2016 |
| CN | 105893391 | A | 8/2016 |
| CN | 106547813 | A | 3/2017 |
| CN | 106612380 | A | 5/2017 |
| CN | 107220353 | A | 9/2017 |
| CN | 107506372 | A | 12/2017 |
| CN | 107590159 | A | 1/2018 |
| EP | 2838249 | A1 | 2/2015 |

OTHER PUBLICATIONS

Office Action dated Nov. 4, 2020, issued in Chinese Application No. 201810339746.3, 13 pages.

\* cited by examiner

CALL PROCESSING METHOD AND APPARATUS, SERVER, STORAGE MEDIUM, AND SYSTEM

CROSS-REFERENCE TO RELATED APPLICATIONS

This application is a continuation of International Application No. PCT/CN2019/082667, filed on Apr. 15, 2019, which claims priority to Chinese Patent Application No. 201810339746.3, filed on Apr. 16, 2018. The disclosures of the aforementioned applications are hereby incorporated by reference in their entireties.

TECHNICAL FIELD

Example embodiments of this disclosure relate to the communications field, and in particular, to a method, an apparatus, a server, a storage medium, and a system for call processing.

BACKGROUND

As an important bridge between an enterprise and a client, a call center handles incoming and outgoing calls through a plurality of channels such as voice, a text, and a video, to provide good service experience for a user and play a key role in maintaining the client and improving a service for the enterprise. In recent years, a breakthrough in an artificial intelligence (AI) technology has brought new opportunities to the development of the call center. Introduction of the artificial intelligence technology enables an AI robot to assist people and replace people. This has become a development trend of a customer service industry. However, due to the current levels of intelligent voice and natural language processing technologies, the interaction capability of a current AI robot cannot entirely replace that of a human agent in a complex language environment and different service backgrounds. Therefore, the human agent usually needs to participate in a process of processing a user service by the AI robot.

Currently, in the process of processing the user service by the AI robot, if a user is not satisfied with a service of the AI robot, the user may proactively request to transfer a call to a human agent for processing, and the human agent learns of the user's requirements through a historical interaction record or re-communication, and completes handling of a subsequent service of the user.

In the process of processing the call by using the foregoing technology, the user needs to proactively request to transfer the call to the human agent, and re-describe a service requirement to the human agent. The human agent needs to spend time on understanding the service requirement and is responsible for handling the subsequent service of the user. The call occupies the human agent for a relatively long time, thereby affecting working efficiency of the human agent and an overall service level of a system. Consequently, call processing efficiency is low.

SUMMARY

Example embodiments of this disclosure provide a method, an apparatus, a server, a storage medium, and a system for call processing, to resolve a problem of low call processing efficiency in a related technology. The technical solutions are as follows:

According to a first aspect, a call processing method is provided, and the method includes:

monitoring, by a server in real time, a call processing process of an artificial intelligence AI robot, to obtain an interaction text of the call, where the interaction text includes a recognition result of a user question and a reply to the user question;

obtaining, by the server, a service level value of the AI robot for the call based on the interaction text; and when the service level value meets a first preset condition, performing, by the server, an intervention operation on the call by using a target agent device, where the target agent device is a device of a human agent that assists the AI robot in call processing.

According to the method provided in this embodiment of this disclosure, a service level of the AI robot is evaluated, and when the service level value meets the preset condition, the human agent is automatically triggered for intervention, and the human agent only assists in the call processing process of the AI robot. In this way, a problem that it takes an excessively long time for the human agent to directly undertake a call is resolved, so that working efficiency of the human agent and an overall service level of a system are ensured, thereby improving call processing efficiency.

In a first possible implementation of the first aspect, the obtaining, by the server, a service level value of the AI robot for the call based on the interaction text includes:

determining, by the server, at least one of AI complexity, service complexity, or user complexity based on the interaction text, where the AI complexity is used to reflect service quality of the AI robot, the service complexity is used to reflect a complexity degree of a service, and the user complexity is used to reflect a degree of a user requirement for service handling; and obtaining, by the server, the service level value based on the at least one of the AI complexity, the service complexity, or the user complexity.

According to the method provided in this embodiment of this disclosure, the service level value of the AI robot is determined by using the at least one of the AI complexity, the service complexity, or the user complexity. Because impact of factors such as the AI robot, the service, and the user are considered, accuracy of the determined service level value is relatively high.

In a second possible implementation of the first aspect, the AI complexity is determined based on at least one of a quantity of question repetitions, a quantity of recognition failures, a questioning keyword, a user tone change, a maximum duration of question recognition, or a maximum length of a single reply;

the service complexity is determined based on at least one of a user consultation duration, a quantity of rounds of consultation interaction, or a service level; and the user complexity is determined based on a quantity of times of repeated dialing for a question.

In a third possible implementation of the first aspect, the method further includes:

obtaining, by the server, an estimated service evaluation value based on the service level value, a historical service level value, and a historical service evaluation value, where the historical service level value is a service level value of any previous call of a same service, and the historical service evaluation value is a satisfaction evaluation value of any previous call of a same service; and when the estimated service evaluation value is less than the historical service evaluation value or a preset expected service evaluation value, determining, by the server, that the service level value meets the first preset condition.

According to the method provided in this embodiment of this disclosure, an alarm mechanism for a service level is determined according to a policy for ensuring a user service evaluation. Because a user evaluation may reflect whether the user is satisfied with call processing by the AI robot and a degree of satisfaction, an alarm for the service level can meet a real intention of the user to some extent in this manner.

In a fourth possible implementation of the first aspect, the method further includes:

determining, by the server, an overall service level value, where the overall service level value is an average value of service level values of the AI robot for all calls of a same service in a preset period; and when the service level value is less than the overall service level value or a preset expected service level value, determining, by the server, that the service level value meets the first preset condition.

According to the method provided in this embodiment of this disclosure, an alarm mechanism for a service level is determined according to a policy for ensuring an overall service level. The overall service level value can reflect an average level of processing calls of a same service by the AI robot. Therefore, an alarm for the service level can improve alarm accuracy to some extent in this manner.

In a fifth possible implementation of the first aspect, the performing, by the server, an intervention operation on the call by using a target agent device includes:

sending, by the server, the interaction text to the target agent device, and obtaining a corrected question text and a corrected reply text that are obtained after the target agent device corrects the interaction text; or transferring, by the server, the call to the target agent device for processing; or establishing, by the server, a three-party conference connection among the target agent device, the AI robot, and user equipment, where the user equipment is a device that initiates the call.

According to the method provided in this embodiment of this disclosure, the target agent device may perform any intervention operation such as text correction, call interception, or session interposition on the call, thereby improving intervention effectiveness.

In a sixth possible implementation of the first aspect, the sending, by the server, the interaction text to the target agent device, and obtaining a corrected question text and a corrected reply text that are obtained after the target agent device corrects the interaction text includes:

sending, by the server, the interaction text to the target agent device;

sending, by the target agent device, the corrected question text to the server;

sending, by the server, the corrected question text to the AI robot;

obtaining, by the AI robot, the corrected question text sent by the target agent device, where the corrected question text is a text obtained after a voice recognition result of the user question is corrected;

obtaining, by the AI robot, the reply to the user question based on the corrected question text;

obtaining, by the server, the corrected reply text sent by the target agent device, where the corrected reply text is a text obtained after the reply to the user question is corrected; and playing, by the server, the corrected reply text.

According to the method provided in this embodiment, the target agent device may correct the user question and the reply, thereby improving an overall service level of a system. Therefore, call processing efficiency is high.

In a seventh possible implementation of the first aspect, after the server corrects the interaction text by using the target agent device, the method further includes:

when the service level value of the AI robot for the call meets a second preset condition, stopping, by the server, the intervention operation on the call; or after correcting the voice recognition result of the user question, stopping, by the server, the intervention operation on the call.

According to the method provided in this embodiment, the target agent device may quit the intervention at an appropriate occasion, thereby avoiding a problem that working efficiency is affected because an excessively long time is occupied.

In an eighth possible implementation of the first aspect, before the performing, by the server, an intervention operation on the call by using a target agent device, the method further includes:

determining, by the server, the target agent device based on a service corresponding to the call and subscription information, where the subscription information is used to record a service to which each agent device subscribes.

According to the method provided in this embodiment, a to-be-monitored service is subscribed to in advance, and therefore the system may determine the target agent device based on subscription information when a call is connected.

In a ninth possible implementation of the first aspect, after the determining, by the server, the target agent device based on a service corresponding to the call and subscription information, the method further includes:

adding, by the server, the call to a monitoring queue of the target agent device, where the monitoring queue is used to manage call information, a call monitoring status, and an interaction text of at least one call, the call information includes a call number, calling party information, and called party information, and the call monitoring status includes an idle state, a monitoring state, or an intervention state.

According to the method provided in this embodiment, a call is added to a corresponding monitoring queue, thereby facilitating management of the call by the target agent device.

In a tenth possible implementation of the first aspect, the first preset condition is set based on a service type.

According to the method provided in this embodiment, a condition for triggering intervention is set based on a service, and different requirements of different services for a service level value are fully considered, thereby improving accuracy of triggering intervention.

According to a second aspect, a call processing apparatus is provided. The apparatus includes a plurality of function modules, and the plurality of function modules are configured to perform the call processing method provided in any one of the first aspect and the possible implementations of the first aspect.

According to a third aspect, a server is provided, and the server includes a processor and a memory. The memory stores a computer program, and the computer program is loaded and executed by the processor to implement the call processing method provided in any one of the first aspect and the possible implementations of the first aspect.

According to a fourth aspect, a computer-readable storage medium is provided. The computer-readable storage medium stores a computer program, and the computer program is loaded and executed by a processor to implement the call processing method provided in any one of the first aspect and the possible implementations of the first aspect.

According to a fifth aspect, a call processing system is provided, and the system includes a server, an AI robot and a target agent device. The server is configured to perform the call processing method provided in any one of the first aspect and the possible implementations of the first aspect.

DESCRIPTION OF EMBODIMENTS

Before the embodiments of this disclosure are described in detail, some key terms in the embodiments of this disclosure are first described.

Voice recognition: A voice recognition technology is a technology in which a voice signal of a person is converted into text information that may be recognized by a computer system, so that the computer system can understand a human language. In a traditional call center, voice recognition is usually used to replace a button with a voice command. In an intelligent customer service era, voice recognition is mainly used in voice navigation and human-machine voice interaction scenarios.

Voice synthesis: A voice synthesis technology is a technology in which text information is converted into voice and is played as voice, to automatically convert a text into continuous human voice in real time. In a traditional call center, voice synthesis is usually used to play voice that needs to change based on different service contents. In an intelligent customer service era, voice synthesis is mainly used in voice navigation and human-machine voice interaction scenarios.

Natural language processing: Natural language processing includes natural semantic understanding and natural language generation. Natural semantic understanding is used to convert a human language into a labeled machine language, and natural language generation is used to convert a machine language into a human language.

Computer telephony integration (CTI): CTI is a general term covering any way of integrating a computer with a telephone system. CTI is most commonly used in a system in which an application program is used to display detailed information about an incoming or outgoing call.

AI robot: An AI robot replaces a human agent by using intelligent voice and natural language processing technologies, thereby implementing an interconnection between the AI robot and a third server.

Agent device: An agent device is a device of a human agent that assists an AI robot in call processing. This type of agent device is mainly used to assist the AI robot, to improve recognition of a user problem and correction of a reply of the AI robot. If necessary, the agent device can also answer a call and handle a service.

Figure 1:
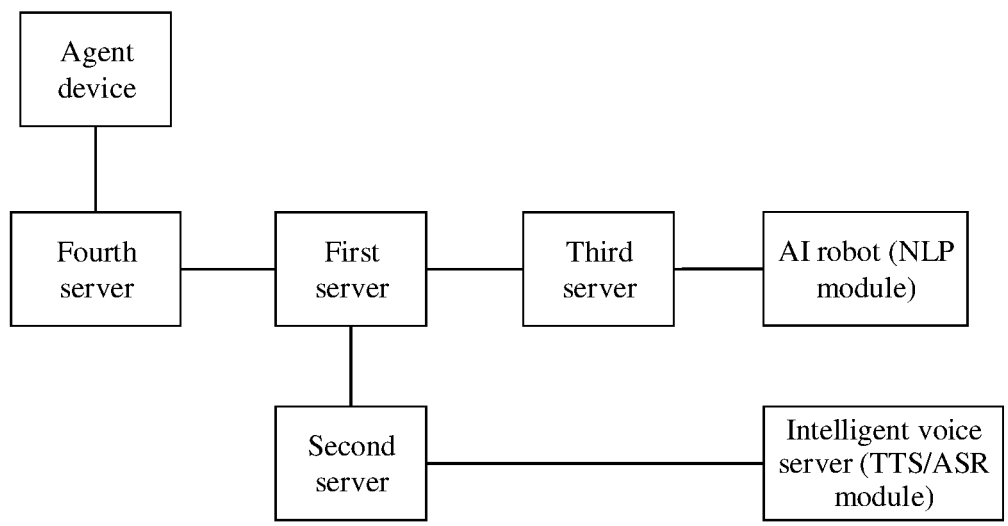
FIG. 1 is a schematic diagram of a system according to an embodiment of this disclosure.

FIG. 1 is a schematic diagram of a system according to an embodiment of this disclosure. Referring to FIG. 1 the system includes a plurality of servers, an AI robot, and a plurality of agent devices. The plurality of servers may include a first server, a second server, a third server, an intelligent voice server, and a fourth server.

Figure 2:
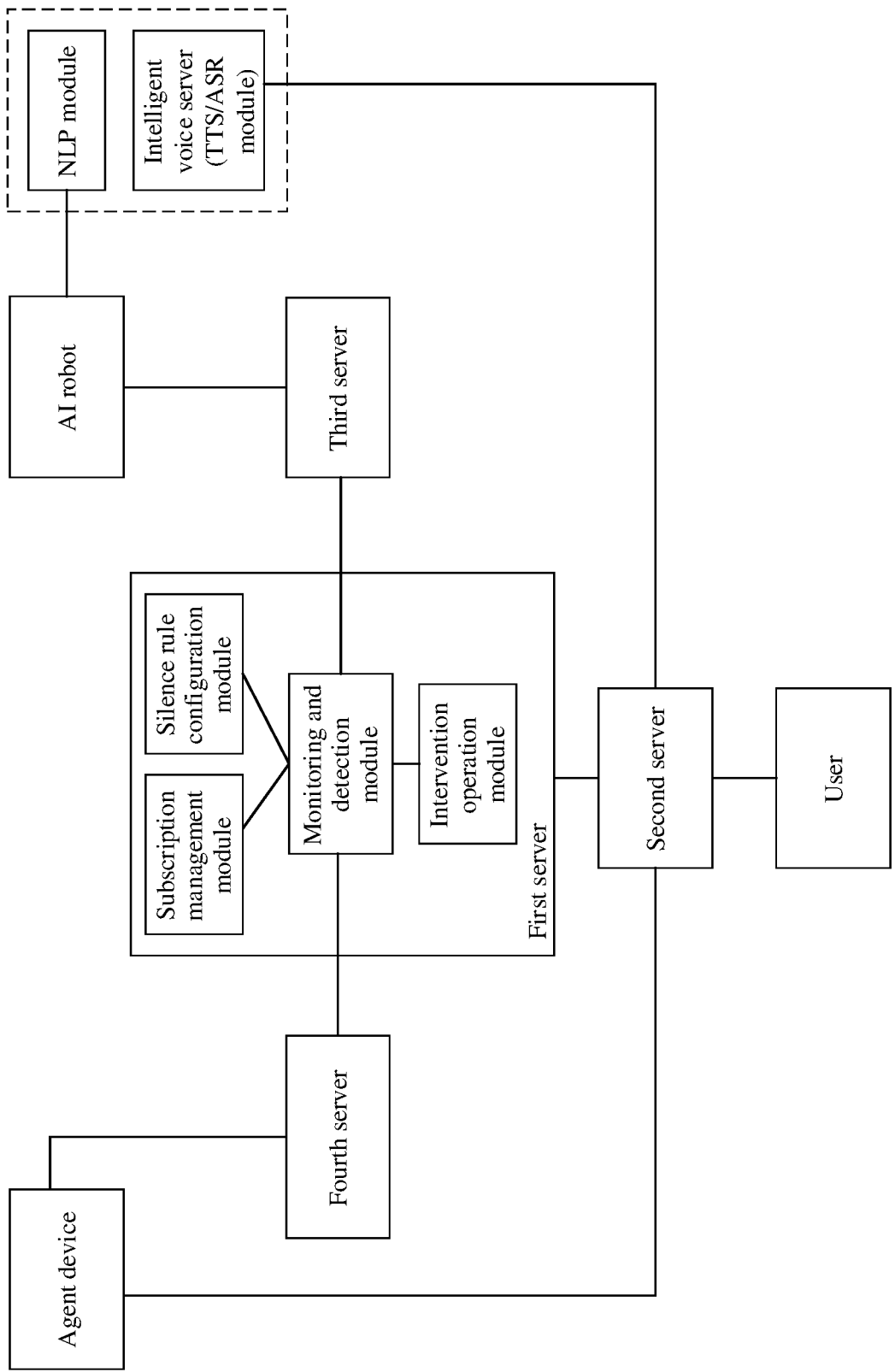
FIG. 2 is a schematic diagram of a system according to an embodiment of this disclosure.

The first server provides capabilities such as unified multimedia access and a flexible routing policy. In embodiments of this disclosure, the first server may be a CTI server. The first server takes a most critical role and is responsible for routing a call and evaluating a service level. FIG. 2 is a schematic diagram of a system according to an embodiment of this disclosure. As shown in FIG. 2, a first server may include a monitoring and detection module and an intervention operation module, and may further include a subscription management module and a silence rule configuration module. The subscription management module is configured to manage a correspondence between an agent device and a service. The silence rule configuration module is adapted to configure a rule for the agent device to assist an AI robot in call processing. The monitoring and detection module is configured to: monitor, in real time, a call processing process of the AI robot, and detect and evaluate a service level of the AI robot. The intervention operation module is configured to send an alarm to the agent device to trigger the agent device to perform an intervention operation on a call.

It should be noted that in this embodiment, an example in which functions of modules such as the subscription management module, the silence rule configuration module, the monitoring and detection module, and the intervention operation module are integrated into the first server is used for description. Actually, the foregoing modules may alternatively form an independent device. Physical implementations of the modules are not limited in embodiments of this disclosure, provided that the functions of the modules can be implemented.

A second server is responsible for unified session management, and provides internet protocol (IP) voice call access, phone number registration and media resource processing functions. In some embodiments, the second server may be a unified session management (USM) server, and the second server is responsible for a media operation of a call, and implements an interconnection with an intelligent voice server.

A third server is responsible for parsing and executing a procedure file loaded onto the third server. This type of file may complete a specified function such as an automatic voice prompt or user information collection. In embodiments of this disclosure, the third server may be an interactive voice response (IVR) server. The third server is responsible for service logic and procedure processing, and implements an interconnection with the AI robot.

The intelligent voice server includes a voice recognition (Automatic Voice Recognition, ASR) module and a voice synthesis (Text To Voice, TTS) module, and provides automatic voice recognition and text-to-voice capabilities. The ASR module is responsible for recognition of common voice, and the TTS module is responsible for text-to-voice synthesis.

The AI robot includes a natural language processing (NLP) module, and has natural language recognition, problem checking and natural language generation capabilities.

A fourth server provides an agent access capability. In embodiments of this disclosure, the fourth server may be an agent server, and the fourth server is responsible for access and management of a plurality of agent devices. The plurality of agent devices are devices of human agents that assist the AI robot in call processing.

It should be noted that this embodiment of this disclosure is described by using an example in which the system provides call access by using the second server. Actually, a call access function may be alternatively provided by another device. For example, the system may further include a trunk gateway, and the trunk gateway provides narrowband relay access, to access a call initiated by a user on an operator side.

It should be noted that this embodiment of the present invention is described by using an example in which the system includes a plurality of servers that are the first server, the second server, the third server, the intelligent voice server, and the fourth server. Actually, the system may include only one server, provided that the server can implement functions provided by the foregoing servers.

Figure 3:
FIG. 3 is a schematic diagram of a server according to an embodiment of this disclosure.

FIG. 3 is a schematic diagram of a server 300 according to an embodiment of this disclosure. The server 300 may be provided as each server in FIG. 1. Referring to FIG. 3, the server 300 may include a processor 310 and a memory 320. The memory 320 stores a computer program, and the processor 310 is configured to execute the computer program stored in the memory 320, to perform the call processing method in the following embodiments. The processor 310 receives a command from another element, decrypts the received command, and performs calculation or processes data according to the decrypted command. The memory 320 may include a program module, for example, a kernel, middleware, an application programming interface (API), and an application. The program module may include software, firmware, hardware, or at least two of the software, the firmware, and the hardware.

In an example embodiment, a computer-readable storage medium is further provided, such as a memory that stores a computer program, and the computer program may be loaded and executed by a processor to complete the call processing method in the following embodiments. For example, the computer-readable storage medium may be a read-only memory (ROM), a random access memory (RAM), a compact disc read-only memory (CD-ROM), a tape, a floppy disk, or an optical data storage device.

Figure 4:
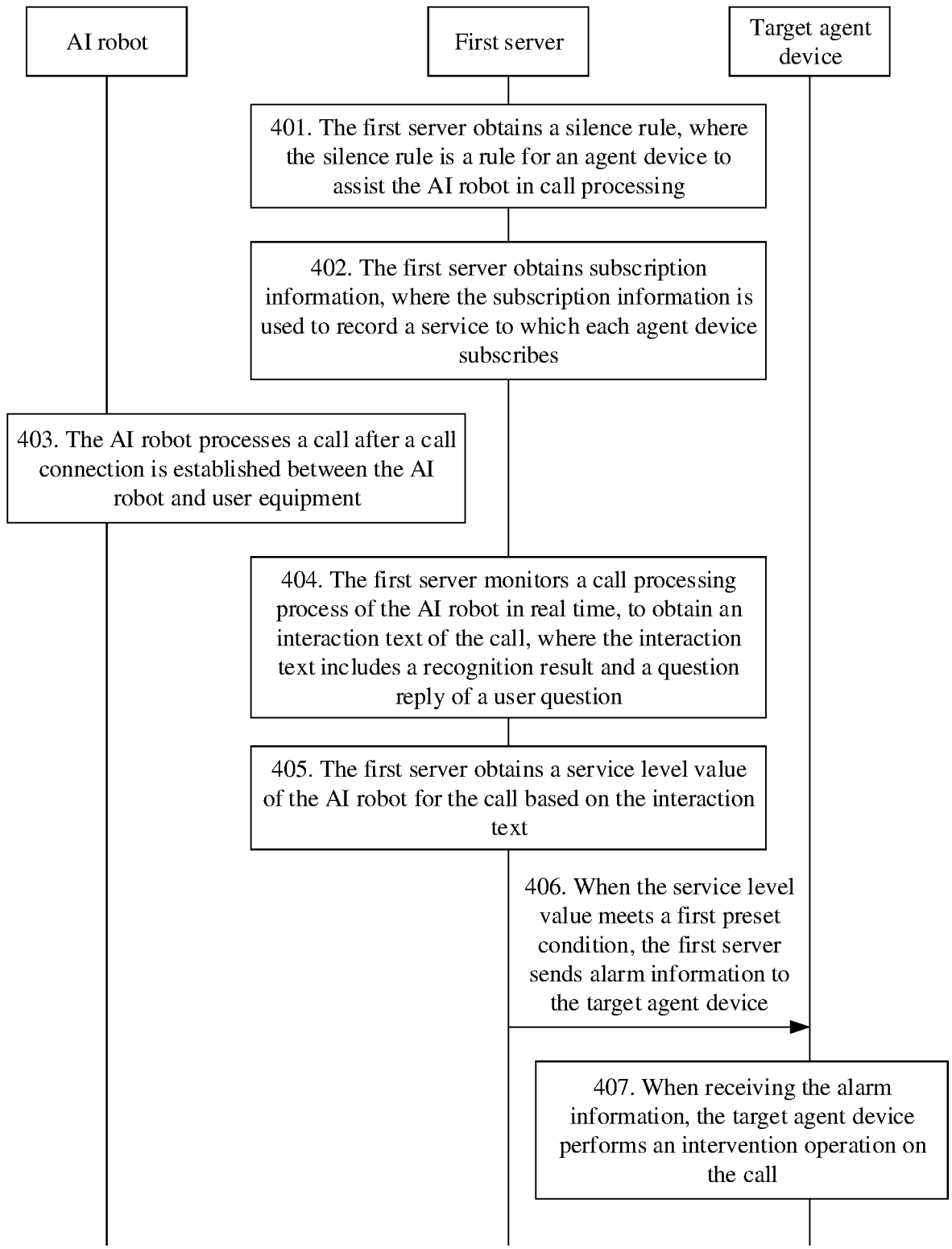
FIG. 4 is a flowchart of a call processing method according to an embodiment of this disclosure.

FIG. 4 is a flowchart of a call processing method according to an embodiment of this disclosure. The method may be applied to the call processing system shown in FIG. 1. Referring to FIG. 4, the call processing method includes the following steps.

401. A first server obtains a silence rule, where the silence rule is a rule for an agent device to assist an AI robot in call processing.

In this embodiment, an administrator may configure the silence rule by using the first server based on a service type, and different services may correspond to different silence rules. The silence rule may include an alarm threshold, an intervention operation (namely, a processing manner triggered by an alarm), and a quantity of concurrently monitored calls.

The alarm threshold may include an expected service level value and an expected service evaluation value. The expected service level value and the expected service evaluation value may be set based on a service type. In other words, different expected service level values and expected service evaluation values are set for different types of services. The intervention operation may include text correction, call interception, and/or interposition. The text correction is performed on an interaction text of a call, and the interaction text is a text obtained by a system in a process of interaction between an AI robot and a user, and includes a recognition result of a user question and a reply to the user question. The call interception is transferring the call to a device of a human agent other than the AI robot for processing. The interposition is that the system establishes a three-party conference connection among the device of the human agent, the AI robot, and user equipment. The user equipment is a device that initiates the call. The human agent can hear interaction between the user and the AI robot, and may replace the AI robot to answer the user question if necessary. The quantity of concurrently monitored calls is a quantity of calls that are simultaneously monitored by a single agent device.

It should be noted that step 401 may be actually performed by a silence rule configuration module of the first server.

402. The first server obtains subscription information, where the subscription information is used to record a service to which each agent device subscribes.

The service is a service that may be processed by the AI robot, such as broadband service handling, a user historical record query, or a package change.

In this embodiment of this disclosure, each agent device may log in to the system (namely, access the system) by using a fourth server. After logging in to the system, the agent device may set, by using the first server, a service that needs to be monitored. For example, a system administrator may set, based on a service skill of the human agent, a service that needs to be monitored by the agent device. In this way, the first server may generate subscription information of each agent device based on a service that is set for each agent device. In addition, the system administrator may further set a corresponding silence rule based on a service to which the agent device subscribes.

Further, the agent device may request to monitor a call of a specific type of service. For example, the agent device may send a subscription management request to the first server, and the first server may create a corresponding monitoring and detection task according to the subscription management request. The subscription management request may carry the service to which the agent device subscribes and the corresponding silence rule.

It should be noted that step 402 may be actually performed by a subscription management module of the first server.

403. The AI robot processes a call after a call connection is established between the AI robot and the user equipment.

Figure 5:
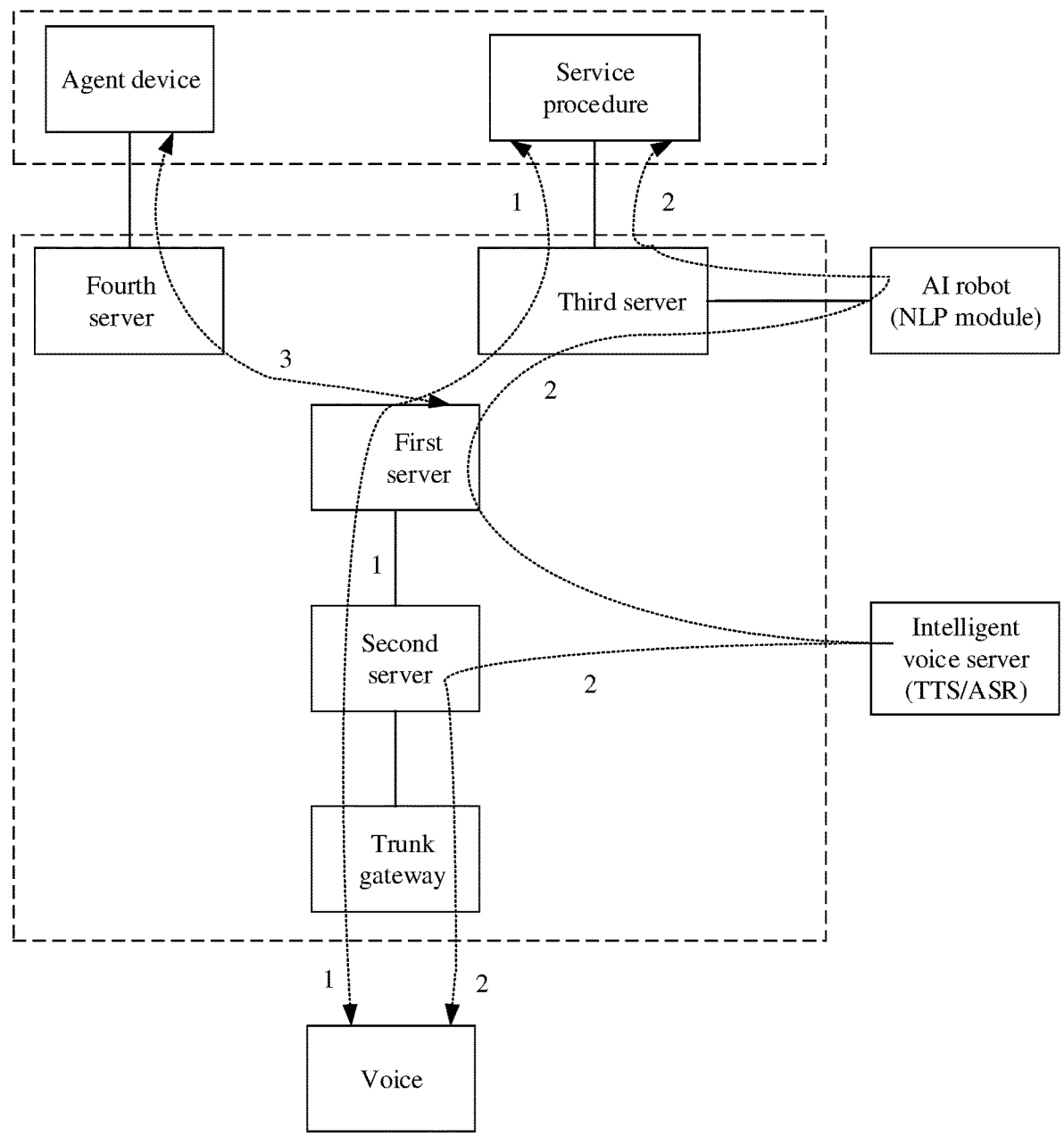
FIG. 5 is a diagram illustrating a call processing process according to an embodiment of this disclosure.

In this embodiment of this disclosure, if the user needs to consult a service or requests handling of a service, the user may proactively make a call to a system of a call center (namely, the system shown in FIG. 1), to establish a call connection to the call center. FIG. 5 is a diagram illustrating a call processing process according to an embodiment of this disclosure. As shown by a procedure indication line 1 in FIG. 5, in a possible implementation, a process of establishing a call connection includes: a call initiated by a user is connected to a trunk gateway of a call center from an operator by using a relay such as E1/T1; the trunk gateway converts a data relay signaling protocol such as primary rate access (PRA) or a primary rate interface (PRI) into a broadband session initiation protocol (SIP) signaling protocol; a second server establishes a call, and requests a route from a first server; the first server routes the call to a third server based on called party information and user information; and the first server establishes a call connection between user equipment and the call center.

A service procedure of the third server implements interconnection with an AI robot. A service procedure in which the first server routes the call to the third server is to route the call to the AI robot. Correspondingly, establishing the call connection between the user equipment and the call center is to establish a call connection between the user equipment and the AI robot, to implement a dialog between the user and the AI robot. For example, the user may speak a to-be-consulted question, and the AI robot may reply to the user question. It should be noted that, after the call connection is established, the first server may determine a target agent device configured to monitor a call processing process. In a possible implementation, the first server determines the target agent device based on a service corresponding to the call and subscription information. The target agent device is an agent device that subscribes to the service corresponding to the call, and the subscription information is used to record a service to which each agent device subscribes.

Figure 6:
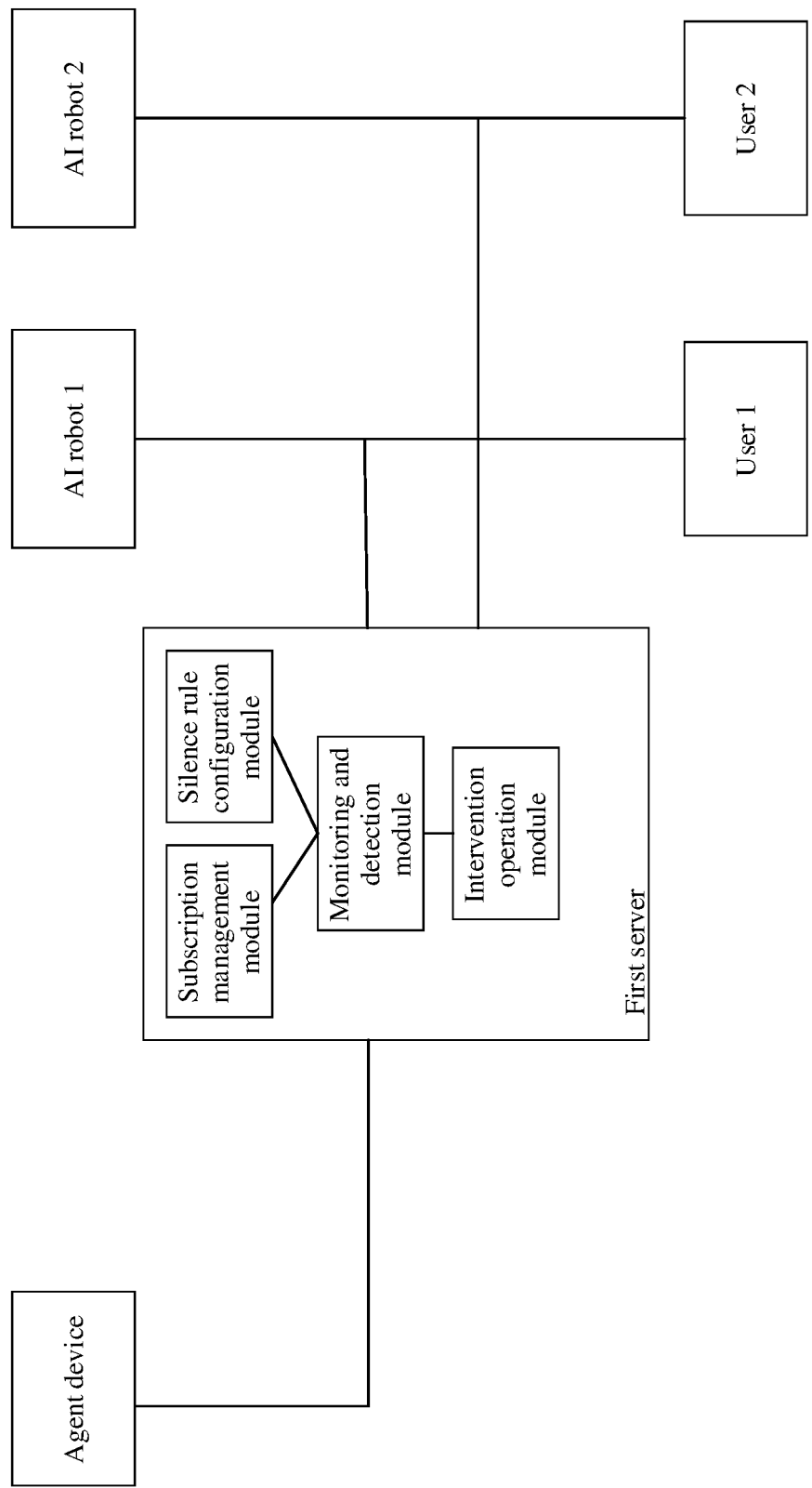
FIG. 6 is a schematic diagram of one-to-many monitoring according to an embodiment of this disclosure.

After determining the target agent device, the first server may allocate the call to the target agent device, and the target agent device monitors an interaction text in the call processing process. A monitoring process includes browsing the interaction text. In a possible implementation, that the first server allocates the call to the target agent device includes: the first server may add the call to a monitoring queue of the target agent device. The monitoring queue is used to manage call information, a call monitoring status, and event information of at least one call, the call information includes a call number (CALLID), calling party information, and called party information, and the call monitoring status includes an idle state, a monitoring state, or an intervention state. The event information includes the interaction text and additional information fed back by the AI robot, for example, a user emotion change. FIG. 6 is a schematic diagram of one-to-many monitoring according to an embodiment of this disclosure. As shown in FIG. 6, an AI robot 1 processes a call of a user 1, an AI robot 2 processes a call of a user 2, and one agent device may simultaneously monitor call processing processes of a plurality of users (the user 1 and the user 2).

It should be noted that this manner is described by using an example in which when a call is connected, the system allocates the call to the target agent device and adds the call to the monitoring queue of the target agent device. Actually, when the target agent device logs in to the system to subscribe to a service, the system may allocate, to the target agent device, a call that is being processed by the AI robot, and add the allocated call to the monitoring queue. In this way, the monitoring queue includes not only a current newly-connected call but also call(s) that is being processed by the AI robot.

404. The first server monitors, in real time, a call processing process of the AI robot, to obtain an interaction text of the call, where the interaction text includes a recognition result of a user question and a reply to the user question.

In this embodiment of this disclosure, after the call of the user is connected to the call center, the user may speak a service that needs to be consulted, and interact with the AI robot. As shown by a procedure indication line 2 in FIG. 5, in a possible implementation, the user and the AI robot may perform voice interaction. A specific interaction process may include: the second server interconnects with an intelligent voice server by using a media resource control protocol (MRCP), and transfers a voice stream to the intelligent voice server; the intelligent voice server recognizes the voice stream, and returns a recognition result to the second server; the second server reports the recognition result to the first server through a call channel; the first server routes the call to the specified third server; the third server performs corresponding service logic processing such as a user information query based on the service procedure; the third server obtains the recognition result from the first server, and forwards the recognition result to an NLP module of the AI robot for processing; the NLP module returns a natural language text generated after analysis processing to the third server; the third server requests, by using the first server and the second server, to play the language text; and the second server requests the intelligent voice server to perform voice synthesis, and the second server plays synthesized voice to the user.

The voice stream is a voice data stream including a user question, the recognition result is a recognition result of the voice data stream, and the natural language text generated after the analysis processing is a reply of the AI robot to the user question. In a process in which the AI robot processes the call of the user, the first server may monitor the processing process of the AI robot to obtain an interaction text between the AI robot and the user. Specifically, the first server may monitor the interaction text of the call based on a subscription status of an agent device, a current status of an agent, and a configured silence rule.

It should be noted that, in the foregoing manner, the recognition result is reported by the second server to the first server. Actually, the recognition result may be directly obtained by the first server from the AI robot. This is not limited in embodiments of this disclosure. The foregoing manner is described by using a voice call as an example. Actually, for a text call or another media call, the first server may similarly obtain an interaction text in a call processing process of the AI robot. However, during the text call, voice recognition does not need to be performed on a user question, and voice synthesis does not need to be performed on a reply to a question either.

In a possible implementation, the first server may synchronously push the interaction text in the call processing process of the AI robot to the target agent device, so that the target agent device can synchronously monitor the interaction text in the call processing process.

It should be noted that step 404 may be actually performed by a monitoring and detection module of the first server.

405. The first server obtains, based on the interaction text, a service level value of the AI robot for the call.

In a possible implementation, that the first server obtains, based on the interaction text, a service level value of the AI robot for the call includes the following steps 405A and 405B.

405A. Determine at least one of AI complexity, service complexity, or user complexity based on the interaction text, where the AI complexity is used to reflect service quality of the AI robot, the service complexity is used to reflect a complexity degree of a service, and the user complexity is used to reflect a degree of a user requirement for service handling.

Because the interaction text may reflect a status of interaction between the AI robot and the user, the first server may determine the service quality of the AI robot based on the interaction text. In a possible implementation, for the AI complexity, the first server may determine, based on the interaction text, an average duration of answering user questions by the AI robot. The first server may learn, from the interaction text, a time point at which the user asks each question and a time point at which the AI robot provides each reply, determine, based on the two time points, a duration of answering each user question by the AI robot, and obtain the AI complexity based on an average value of the duration. For the service complexity, the first server may determine, based on the user question in the interaction text, a service requested by the user, and further determine the service complexity based on a service type and a preset correspondence between the service type and the service complexity. A more complex service corresponds to higher service complexity. For the user complexity, the first server may determine the user complexity based on a quantity of user questions in the interaction text. More user questions correspond to higher user complexity.

Certainly, there are other manners of determining the AI complexity, the service complexity, and the user complexity. In a possible implementation, the AI complexity is determined based on at least one of a quantity of question repetitions, a quantity of recognition failures, a questioning keyword, a user tone change, a maximum duration of question recognition, or a maximum length of a single reply. The service complexity is determined based on at least one of a user consultation duration, a quantity of rounds of consultation interaction, or a service level. The user complexity is determined based on a quantity of times of repeated dialing for a question.

The quantity of question repetitions is a quantity of times of repeating a user question or a quantity of times of repeating a statement. The first server may determine, by retrieving a plurality of rounds of voice recognition results of user questions, whether there is a same question or whether a statement is repeated, and use a quantity of same questions or a quantity of times of repeating a statement as the quantity of question repetitions. Considering that the intelligent voice server is configured to recognize a user question to obtain a voice recognition result, the quantity of question repetitions may be obtained by the intelligent voice server and then returned to the first server. The quantity of recognition failures is a quantity of times that the AI robot cannot understand a voice recognition result of a user question. The AI robot performs semantic understanding on the voice recognition result to obtain a semantic understanding result. If the AI robot cannot understand the voice recognition result, the semantic understanding result includes preset description information. The first server may search for the semantic understanding result of the AI robot, and use a quantity of times that the preset description information appears as the quantity of recognition failures. For example, the preset description information may be "Fail to understand your problem". Considering that the NLP module of the AI robot is configured to perform semantic understanding on the voice recognition result of the user question, the quantity of recognition failures may be returned by the NLP module to the first server when the NLP module returns the semantic understanding result. The questioning keyword is a word that represents a doubt in a user question. The first server may retrieve a plurality of rounds of voice recognition results of the user, determine whether there is a questioning keyword and whether there is a same questioning keyword, and collect statistics on a quantity of questioning keywords or a quantity of same questioning keywords. Similar to the quantity of question repetitions, the questioning keyword may be obtained by the intelligent voice server and then returned to the first server. The user tone (emotion) change is a tone change of the user in a process of communicating with the AI robot. The intelligent voice server checks the tone change of the user, and returns the tone change to the first server as a voice recognition result. The first server may convert the user tone change into a number. The maximum duration of question recognition is a maximum duration consumed for recognizing a complete user problem. After a plurality of rounds of interaction between the AI robot and the user, the first server may learn of, from the interaction text, a duration consumed by the user to ask each problem and obtain a recognition result of the problem, and obtain a maximum duration as the maximum duration of question recognition. The maximum length of a single reply is a maximum length of a retrieval result (namely, a reply to a question) of the AI robot for a user question. The length may be a quantity of words, lines, or pages. After a plurality of rounds of interaction between the AI robot and the user, the first server may learn of, from the interaction text, a quantity of words, lines, or pages of a reply to each user question, and obtain a maximum quantity of words or lines as the maximum length of a single reply. For obtaining of the AI complexity, the first server may perform weighted summation on the quantity of question repetitions, the quantity of recognition failures, the questioning keyword, the user tone change, the maximum duration of question recognition, and the maximum length of a single reply in a digital form, to obtain the AI complexity in a digital form.

The user consultation duration is an average consultation duration of users, and a consultation duration is a duration from a start of interaction between a user and the AI robot to an end of the interaction with the AI robot. The first server may obtain an average processing duration of a corresponding service by associating a database. For example, a call record of a user who requests handling of each service is recorded in the database, and a user call record of a current service may be selected through screening, including a time point at which a connection for a call is successfully established and a time point at which the call ends. Duration of each user call record may be obtained based on the two time points, and then an average value of durations of user calls is used as the user consultation duration. The quantity of rounds of consultation interaction is an average value of quantities of rounds of interaction between users and the AI robot. The first server may obtain an average value of quantities of rounds of interaction for a corresponding service by associating the database. For example, the user call record selected through screening further includes a quantity of times of interaction between a user and the AI robot, and the first server may use an average value of quantities of times of interaction between users and the AI robot as the quantity of rounds of consultation interaction. Service levels are defined for different types of services, such as a level 1, a level 2, and . . . . For obtaining of the service complexity, the first server may perform a weighted summation on the user consultation duration, the quantity of rounds of consultation interaction, and the service level in a digital form, to obtain the service complexity in a digital form.

The quantity of times of repeated dialing for a question is a quantity of times of repeated service handling. The first server may retrieve a service in the interaction text, determine whether the service is repeatedly handled, and determine a quantity of times of repeated handling. The quantity of times is used as the quantity of times of repeated dialing for a question. For obtaining of the user complexity, the first server may directly obtain the quantity of times of repeated dialing for a question in a digital form as the user complexity, or multiply the quantity of times of repeated dialing for a question by a preset coefficient to obtain the user complexity in a digital form.

The service level value of the AI robot for the call is determined by using the at least one of the AI complexity, the service complexity, or the user complexity. Because impact of factors such as the AI robot, the service, and the user are considered, accuracy of the determined service level value is relatively high.

405B. Obtain the service level value based on the at least one of the AI complexity, the service complexity, or the user complexity.

In a possible implementation, the first server may perform weighted summation on the at least one of the AI complexity, the service complexity, or the user complexity, and use a result of the weighted summation as the service level value. Weights of the AI complexity, the service complexity, and the user complexity may be configured based on operating experience. For example, AI service level=AI complexity×S1+Service complexity×S2+User complexity×S3. S1, S2, and S3 are weights. For example, S1 is 0.3, S2 is 0.3, and S3 is 0.4.

It should be noted that step 405 may be performed by the monitoring and detection module of the first server.

406. When the service level value meets a first preset condition, the first server sends alarm information to the target agent device, where the target agent device is a device of a human agent that assists the AI robot in call processing.

The alarm information is used to instruct the target agent device to perform an intervention operation on the call, to assist the AI robot in processing the call. As shown by a procedure indication line 3 in FIG. 5, the first server may interact with an agent device by using the fourth server, for example, send the alarm information to the agent device. For example, the alarm information may include call information that is used to indicate a call that requires intervention of the target agent device. In a possible implementation, the first preset condition may be set based on a service, and different services correspond to different first preset conditions. For example, different services correspond to different expected service evaluation values or expected service level values.

In a possible implementation, a process in which the first server determines that the service level value meets the first preset condition may include:

obtaining an estimated service evaluation value based on the service level value, a historical service level value, and a historical service evaluation value, for example, Estimated service evaluation value=(Historical service evaluation value/Historical service level value)×Service level value; and when the estimated service evaluation value is less than the historical service evaluation value or a preset expected service evaluation value, determining that the service level value meets the first preset condition.

In an embodiment, the historical service level value may be a service level value of any previous call of a same service. For example, when the AI robot processes any previous call of a same service, the system calculates an evaluation value of a service level of the call. The historical service evaluation value is a satisfaction evaluation value of any previous call of a same service. For example, when the AI robot processes any previous call of a same service, the user feeds back a satisfaction evaluation on call processing, and the satisfaction evaluation may be converted into a number. For example, if the satisfaction evaluation is five stars or very satisfied, the historical service evaluation value is 5. The expected service evaluation value is an expected value of a user evaluation.

In this manner, an alarm mechanism for a service level is determined according to a policy for ensuring a user service evaluation. A historical service evaluation is used to reflect whether the user is satisfied with the AI robot when the AI robot processes the call at a historical service level and a degree of satisfaction. Therefore, a service evaluation obtained when the AI robot processes the call at a current service level may be estimated based on the historical service level and the historical service evaluation. In this way, an alarm for the service level can meet a real intention of the user to some extent.

Figure 7:
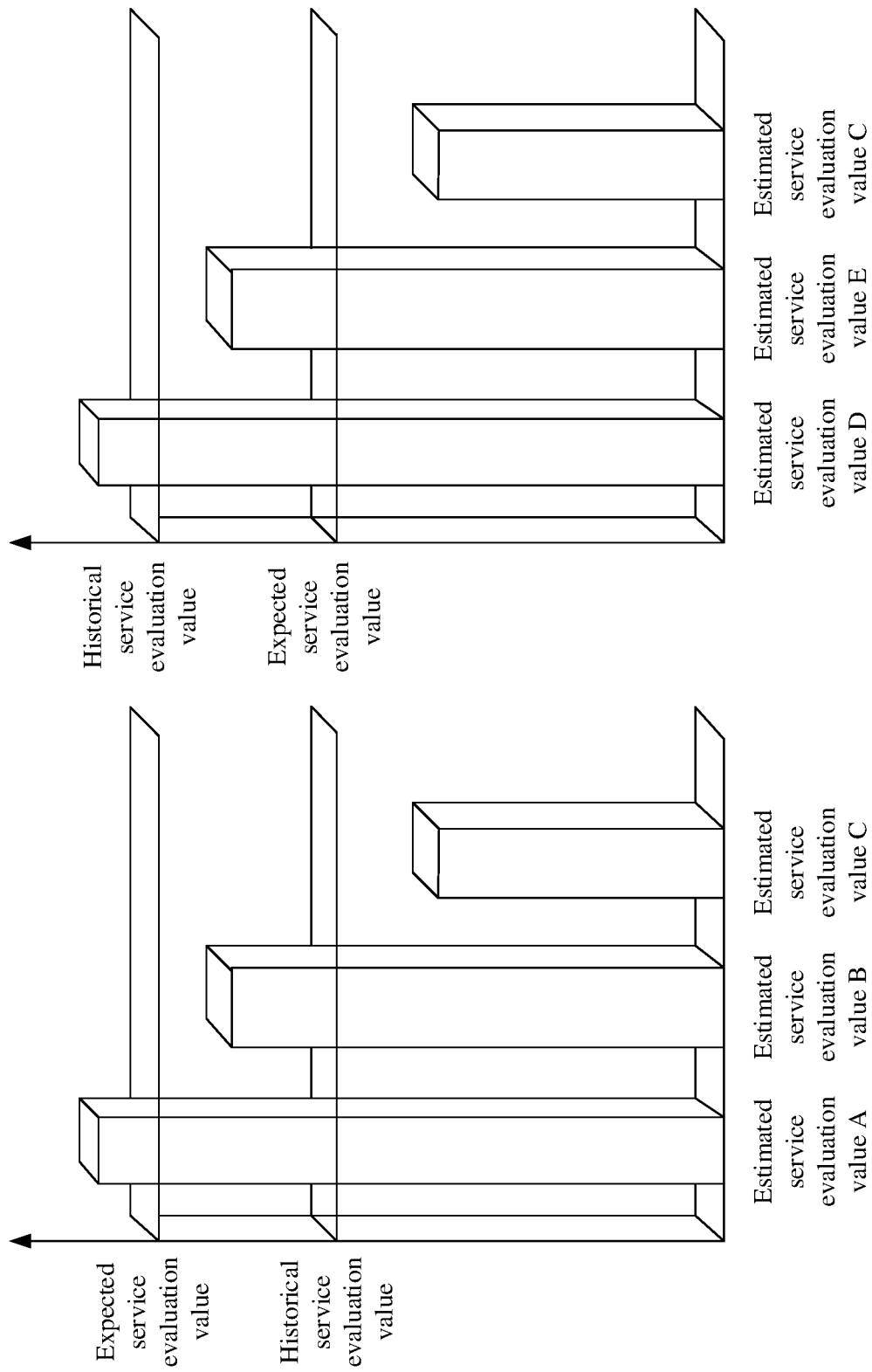
FIG. 7 is a schematic diagram of an alarm scenario based on a service evaluation value according to an embodiment of this disclosure.

FIG. 7 is a schematic diagram of an alarm scenario based on a service evaluation value according to an embodiment of this disclosure. As shown in FIG. 7, in scenarios A and D, if an estimated service evaluation value is greater than an expected service evaluation value and a historical service evaluation value, no alarm is triggered. In each of scenarios B, C, E, and F, if the estimated service evaluation value is less than an expected service evaluation value or a historical service evaluation value, an alarm is triggered.

In addition, the first server may further obtain a ranking position of each call based on a service level value of the AI robot for each call, then perform ranking based on the ranking position, and instruct, by sending alarm information, an agent device for intervention. A call ranked higher is preferentially intervened in. For example, the first server may obtain a ranking value of each call based on a first preset algorithm. The ranking value is used to determine a ranking position, and a larger ranking value indicates a call ranked higher.

The first preset algorithm may be: Ranking value=(Expected service evaluation value−Estimated service evaluation value)×S4+(Historical service evaluation value−Estimated service evaluation value)×S5. S4 and S5 are weights used to calculate the ranking value and may be configured based on operating experience. For example, S4 is 0.5, and S5 is 0.5.

In a possible implementation, a process in which the first server determines that the current service level value meets the first preset condition may include: determining an overall service level value; and when the service level value is less than the overall service level value or a preset expected service level value, determining that the service level value meets the first preset condition. The overall service level value is an average value of service level values of all calls of the AI robot for a same service (namely, a current calling service) in a preset period. For example, for each call of the service, the system may obtain a service level value of the AI robot for each call in a specific sampling period, and then use an average value of service level values obtained in a plurality of sampling periods as the overall service level value. The plurality of sampling periods are the preset period.

In this manner, an alarm mechanism for a service level is determined according to a policy for ensuring an overall service level. The overall service level value can reflect an average service level of processing calls of a same service by the AI robot. Therefore, an alarm for the service level can improve alarm accuracy to some extent in this manner.

When the current service level value is greater than the expected service level value and the overall service level value, no alarm is triggered. When the service level value is less than the expected service level value or the overall service level value, an alarm is triggered. A ranking value of each call is obtained based on a second preset algorithm to determine a ranking position of each call, and alarm information is sent to instruct an agent device for intervention. A call ranked higher is preferentially intervened in.

Figure 8:
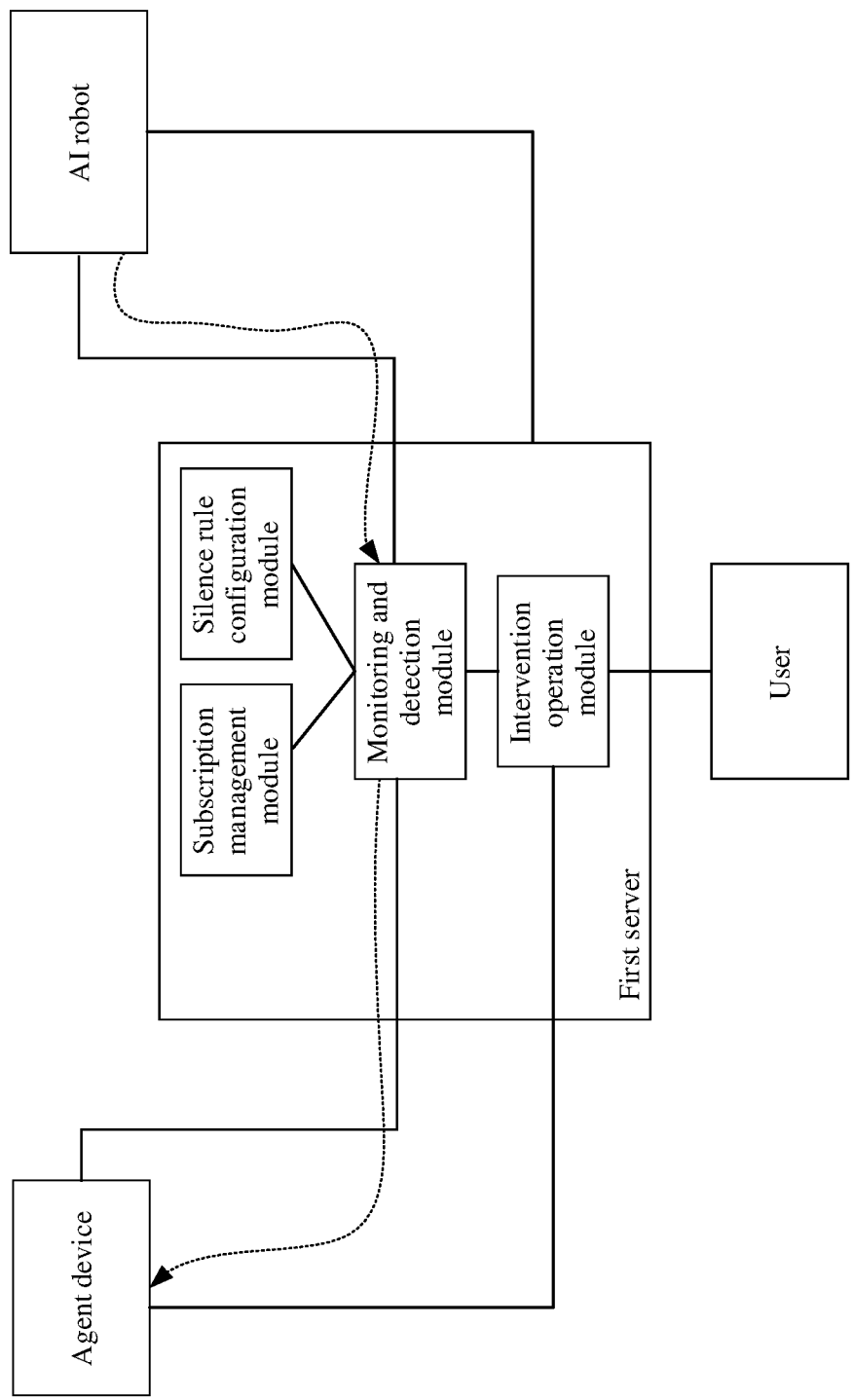
FIG. 8 is a schematic diagram of monitoring and evaluating a call according to an embodiment of this disclosure.

The second preset algorithm may be: Ranking value=(Expected service level value−Current service level value)×S5+(Overall service level value−Current service level value)×S6. S5 and S6 are weights used to calculate the ranking value and may be configured based on operating experience. For example, S5 is 0.5, and S6 is 0.5. FIG. 8 is a schematic diagram of monitoring and evaluating a call according to an embodiment of this disclosure. As shown in FIG. 8, a monitoring and detection module of a first server evaluates a service level of an AI robot, and when a service level value meets a preset condition, an alarm is automatically triggered, so that a human agent can pay attention to or intervene in a call processing process of the AI robot in advance. In this way, a user question and a reply are corrected in real time. In a scenario in which the AI robot cannot process a call, a problem that it takes an excessively long time for the user to proactively transfer the call to the human agent and for the human agent to directly undertake an AI call is resolved, thereby ensuring an overall service level of a system and user satisfaction.

407. When receiving the alarm information, the target agent device performs an intervention operation on the call.

In this embodiment of this disclosure, the intervention operation performed by the target agent device on the call may be an intervention operation indicated by a silence rule that is set when a service is subscribed to. The intervention operation may include text correction, call interception, and/or interposition. Correspondingly, that the target agent device performs an intervention operation on the call includes: the interaction text is corrected by using the target agent device; the call is transferred to the target agent device for processing; and/or a three-party conference connection is established among the target agent device, the AI robot, and the user equipment.

If the intervention operation is text correction (namely, preprocessing), the target agent device monitors interaction between the AI robot and the user in a text format. During the intervention, the user question and the reply are also corrected in a text format, without independently occupying the entire target agent device. Therefore, the target agent device may simultaneously monitor interaction texts of a plurality of calls and perform an intervention operation on the plurality of calls.

If the intervention operation is call interception, after the call initiated by the user is transferred to the target agent device, the target agent device may be fully responsible for processing a subsequent service of the user. This ensures that when the AI robot cannot process a user service, the user service can be processed by the human agent in a timely manner.

Usually, for a complex service, if the intervention operation is interposition (also referred to as call pickup), the human agent may form a three-party conference with the user and the AI robot, and the human agent can hear interaction between the user and the AI robot. If the AI robot cannot answer a question in the interaction process, the human agent may directly answer the question of the user in place of the AI robot, thereby improving interaction efficiency.

In a possible implementation, that the target agent device corrects the interaction text includes: sending the interaction text to the target agent device; obtaining a corrected question text sent by the target agent device, where the corrected question text is a text obtained after a voice recognition result of the user question is corrected; obtaining the reply to the user question based on the corrected question text; obtaining a corrected reply text sent by the target agent device, where the corrected reply text is a text obtained after the reply to the user question is corrected; and playing the corrected reply text.

For example, when the first server synchronously pushes the recognition result of the user question to the target agent device, a target agent may correct the recognition result of the user question, and then submit a corrected question text to the first server on the target agent device. The third server may obtain the corrected question text from the first server, and send the corrected question text to the AI robot. The AI robot performs analysis processing on the corrected question text by using the NLP module, including retrieving the reply to the user question, generating a reply in a form of a natural language text, and then returning the reply to the third server. Then, the third server sends the reply to the first server. In this case, the first server may synchronously push the reply to the target agent device, and after correcting the reply, the target agent may submit the corrected reply text to the first server on the target agent device. Then, the first server requests the second server to play the corrected reply text, and the second server requests the intelligent voice server to perform voice synthesis on the reply, for example, a TTS module of the intelligent voice server performs voice synthesis, and then plays the synthesized voice to the user.

It should be noted that this embodiment is described by using only an example in which the target agent device corrects the recognition result of the user question and the reply to the user question. In other embodiments, the target agent device may further correct a semantic understanding result of the user question, so that the AI robot can retrieve the reply based on a corrected semantic understanding result, thereby further ensuring accuracy of the reply. In this case, the interaction text pushed by the first server to the target agent device further includes the semantic understanding result of the AI robot for the user question, and the semantic understanding result is a result obtained after the AI robot performs semantic understanding on the recognition result of the user question.

In a possible implementation, after the interaction text is corrected by using the target agent device, the target agent device may stop the intervention operation at an appropriate occasion. For example, at a first quitting occasion, when the service level value of the AI robot for the call meets a second preset condition, the intervention operation on the call is stopped. At a second quitting occasion, after the voice recognition result of the user question is corrected, the intervention operation on the call is stopped. The intervention on the call may be quit at an appropriate occasion, thereby avoiding the problem that working efficiency is affected because the human agent is occupied for an excessively long time.

The second preset condition may be that the service level value of the AI robot for the call is greater than the expected service level value and the overall service level value. Alternatively, the second preset condition may be another condition. This is not limited in embodiments of this disclosure. The second quitting occasion may be that the intervention is quit after an interference problem is resolved. The interference problem is a user problem that cannot be understood by the AI robot.

It should be noted that step 406 and step 407 are in a possible implementation in which the target agent device performs the intervention operation on the call when the service level value meets the first preset condition. When the service level value of the AI robot for the call does not meet the condition, alarm information is sent to the target agent device, so that the target agent device can intervene in the call based on the alarm information in a timely manner. Alternatively, when the service level value meets the first preset condition, the first server may directly perform the intervention operation on the call by using the target agent device, without sending the alarm information to the target agent device. For example, the first server instructs, by sending an intervention instruction to the target agent device, the target agent device to intervene in the call.

Figure 9:
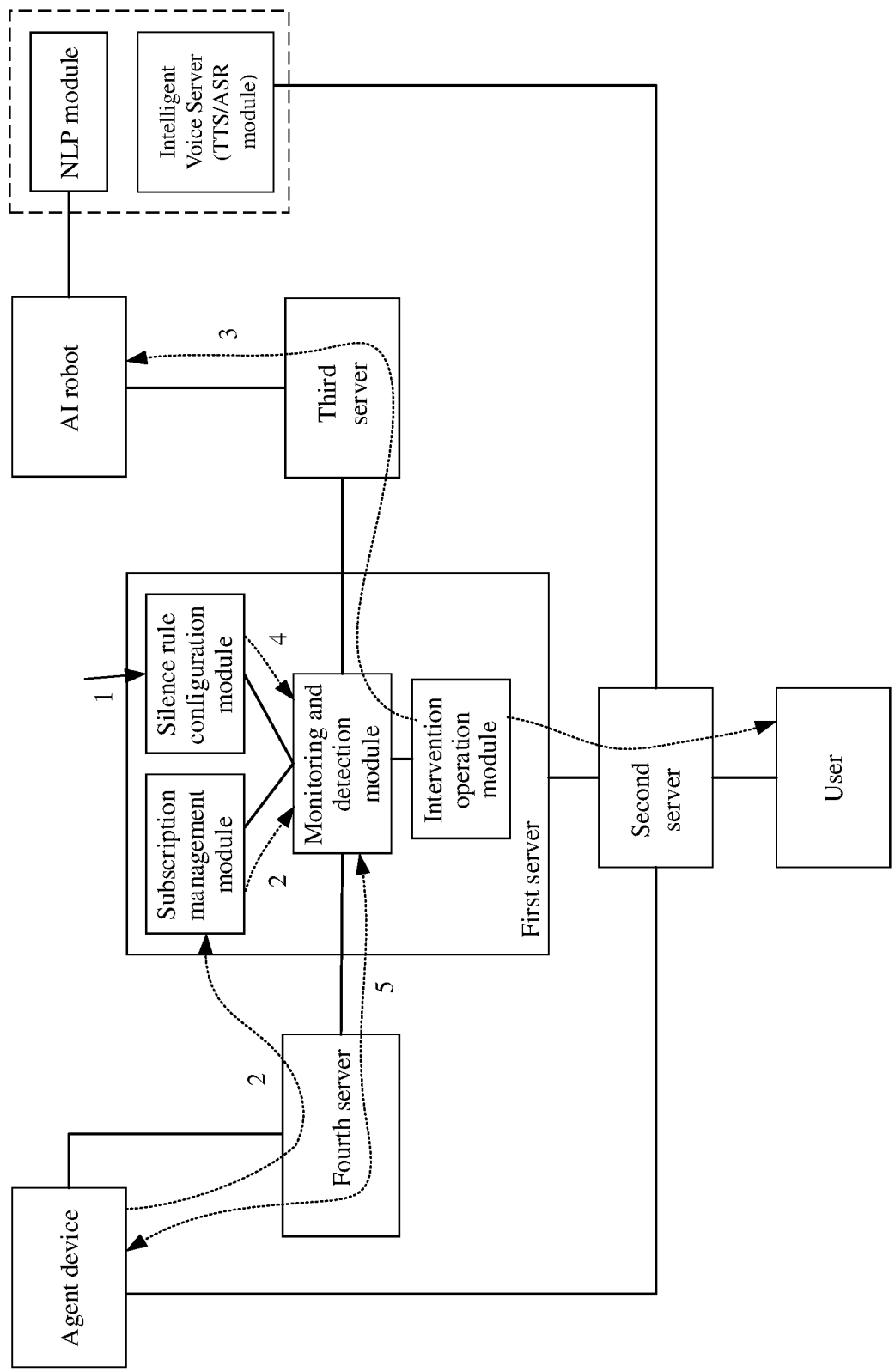
FIG. 9 is a diagram illustrating a call processing process according to an embodiment of this disclosure.

FIG. 9 is a diagram illustrating a call processing process according to an embodiment of this disclosure. As shown by a procedure indication line 1 in FIG. 9, an administrator configures a silence rule by using a silence rule configuration module of a first server (corresponding to step 401). As shown by a procedure indication line 2 in FIG. 9, an agent device logs in to a system by using a fourth server and subscribes to a call of a corresponding service by using a subscription management module of the first server (corresponding to step 402). As shown by a procedure indication line 3 in FIG. 9, when a user makes a call to the system, the system routes the user call to the agent device (corresponding to step 403). As shown by a procedure indication line 4 in FIG. 9, a monitoring and detection module of the first server monitors a call processing process of an AI robot, and evaluates a service level of the AI robot (corresponding to step 404 and step 405). As shown by a procedure indication line 5 in FIG. 9, the agent device intervenes in the call (corresponding to step 406 and step 407).

In the technical solution provided in this embodiment of this disclosure, the first server implements silence rule customization, call monitoring and subscription, call processing process monitoring, automatic detection, and real-time intervention. An agent device monitors, based on a service capability of the agent device, a plurality of calls that are being processed by the AI robot. The agent device may simultaneously browse interaction content of the calls. The system automatically detects the interaction content and evaluates a service level, and issues an alarm for a call with a relatively low evaluation value, to trigger the agent device to perform intervention such as text correction, interception, and interposition in real time.

For the user, after several rounds of interaction with the AI robot, the system automatically understands and continues to process a subsequent service of the user. In this way, the user does not perceive the intervention of the human agent, so that service experience of the user is good. For the human agent, the human agent only corrects a recognized problem or a retrieved answer, and subsequent service handling is still completed by the AI robot. The human agent only participates in the assistance to the AI robot in some phases of the service procedure, so that working efficiency is relatively high. For the system, the user strives to interact with the AI robot and finally completes service handling. The user is aware of intelligence and learning capability of the system, thereby enhancing approval from the user for the system. In addition, the human agent only assists the AI robot in work, and may further correct and train the system more efficiently and professionally.

Currently, in some professional and complex language scenarios, interaction between the user and the AI robot cannot reach a service level of a common human agent. The foregoing solution in which human assistance to the AI robot is used to process a call is an efficient and low-cost solution, to improve service quality of the AI robot and ensure that the AI robot can process the call without a blind spot, thereby improving overall satisfaction of the system. It should be noted that embodiments of this disclosure are described by using an example in which the human agent assists the AI robot. Alternatively, the foregoing technical solution is also applicable to a human assistance scenario of another kind of intelligent device.

According to the method provided in this embodiment of this disclosure, the service level of the AI robot is evaluated, and when the service level value meets the preset condition, the human agent is automatically triggered for intervention, and the human agent only assists in the call processing process of the AI robot. In this way, a problem that it takes an excessively long time for the human agent to directly undertake a call is resolved, so that working efficiency of the human agent and an overall service level of the system are ensured, thereby improving call processing efficiency.

Figure 10:
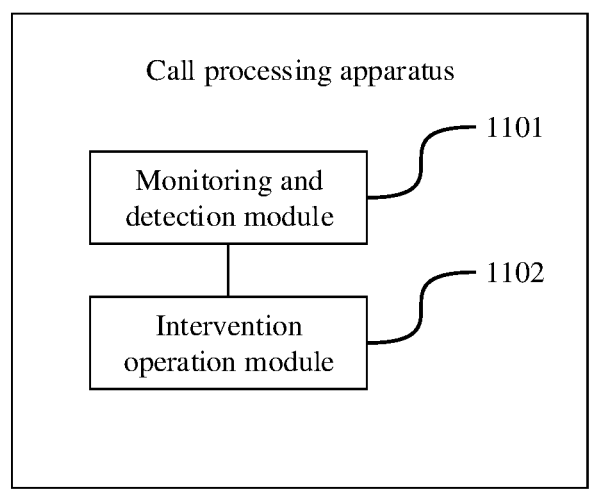
FIG. 10 is a schematic diagram of a call processing apparatus according to an embodiment of this disclosure.

FIG. 10 is a schematic diagram of a call processing apparatus according to an embodiment of this disclosure. Referring to FIG. 10, the apparatus includes a monitoring and detection module 1001 and an intervention operation module 1002.

The monitoring and detection module 1001 is configured to monitor a call processing process of an artificial intelligence AI robot, to obtain an interaction text of the call, where the interaction text includes a recognition result of a user question and a reply to the user question.

The monitoring and detection module 1001 is configured to obtain a service level value of the AI robot for the call based on the interaction text.

The intervention operation module 1002 is configured to: when the service level value meets a first preset condition, perform an intervention operation on the call by using a target agent device, where the target agent device is a device of a human agent that assists the AI robot in call processing.

In a possible implementation, the monitoring and detection module 1001 is configured to perform the process of obtaining the service level value in the step 405.

In a possible implementation, the AI complexity is determined based on at least one of a quantity of question repetitions, a quantity of recognition failures, a questioning keyword, a user tone change, a maximum duration of question recognition, or a maximum length of a single reply.

The service complexity is determined based on at least one of a user consultation duration, a quantity of rounds of consultation interaction, or a service level.

The user complexity is determined based on a quantity of times of repeated dialing for a question.

In a possible implementation, the monitoring and detection module 1001 is further configured to perform the process of determining, in the step 406, that the service level value meets the first preset condition.

In a possible implementation, the intervention operation module 1002 is configured to perform the process of performing an intervention operation on the call in the step 407.

In a possible implementation, the intervention operation module 1001 is further configured to perform the process of stopping the intervention operation on the call in the step 407.

In a possible implementation, the monitoring and detection module 1001 is further configured to perform the process of determining the target agent device in the step 403.

In a possible implementation, the monitoring and detection module 1001 is further configured to perform the process of adding the call to the monitoring queue of the target agent device in the step 403.

In a possible implementation, the first preset condition is set based on a service type.

According to the apparatus provided in this embodiment of the present disclosure, the service level of the AI robot is evaluated, and when the service level value meets a preset condition, the human agent is automatically triggered for intervention, and the human agent only assists in the call processing process of the AI robot. In this way, a problem that it takes an excessively long time for the human agent to directly undertake a call is resolved, so that working efficiency of the human agent and an overall service level of a system are ensured, thereby improving call processing efficiency.

An embodiment of this disclosure further provides a call processing system. The system includes an AI robot, a first server, and a target agent device.

The AI robot is configured to process a call. The first server is configured to monitor, in real time, a call processing process of the AI robot, to obtain an interaction text of the call, where the interaction text includes a recognition result of a user question and a reply to the user question. The first server is further configured to obtain a service level value of the AI robot for the call based on the interaction text. The target agent device is configured to perform an intervention operation on the call when the service level value meets a first preset condition, where the target agent device is a device of a human agent that assists the AI robot in call processing.

In a possible implementation, the first server is configured to perform the process of obtaining the service level value in the step 405.

In a possible implementation, the AI complexity is determined based on at least one of a quantity of question repetitions, a quantity of recognition failures, a questioning keyword, a user tone change, a maximum duration of question recognition, or a maximum length of a single reply.

The service complexity is determined based on at least one of a user consultation duration, a quantity of rounds of consultation interaction, or a service level.

The user complexity is determined based on a quantity of times of repeated dialing for a question.

In a possible implementation, the first server is further configured to perform the process of determining, in the step 406, that the service level value meets the first preset condition.

In a possible implementation, the target agent device is configured to perform the process of performing an intervention operation on the call in the step 407.

In a possible implementation, the system further includes a third server for interactive voice response and a second server for unified session management.

The first server is further configured to perform the process of sending the interaction text to the target agent device in the step 404. The target agent device is configured to perform the process of sending the corrected question text in the step 407. The third server is configured to perform the process of obtaining the corrected question text and sending the corrected question text to the AI robot in the step 407, and the AI robot is further configured to perform the process of obtaining a reply in the step 407. The third server is configured to perform the process of obtaining the corrected reply text in the step 407. The second server is configured to perform the process of playing the corrected reply text in the step 407.

In a possible implementation, the target agent device is further configured to perform the process of stopping the intervention operation on the call in the step 407.

In a possible implementation, the first server is further configured to perform the process of determining the target agent device in the step 403.

In a possible implementation, the first server is further configured to perform the process of adding the call to the monitoring queue of the target agent device in the step 403.

In a possible implementation, the first preset condition is set based on a service type.

According to the system provided in embodiments of the present disclosure, the service level of an AI robot is evaluated, and when the service level value meets a preset condition, a human agent is automatically triggered for intervention, and the human agent only assists in the call processing process of the AI robot. In this way, a problem that it takes an excessively long time for the human agent to directly undertake a call is resolved, so that working efficiency of the human agent and an overall service level of a system are ensured, thereby improving call processing efficiency.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely alternative embodiments of this disclosure, but are not intended to limit this disclosure. Any modification, equivalent replacement, or improvement made without departing from the spirit and principle of this disclosure should fall within the protection scope of this disclosure.

What is claimed is:

1. A call processing method implemented by a server, comprising:
    monitoring, in real time, a call processing process of an artificial intelligence (AI) robot, to obtain an interaction text of a call, wherein the interaction text comprises a recognition result of a user question and a reply to the user question;
    obtaining a service level value of the AI robot for the call based on the obtained interaction text, the service level value indicating service level of the AI robot;
    determining whether the service level value meets a first condition; and
    in response to the determination that the service level value meets the first condition, performing an intervention operation on the call by using a target agent device, wherein the target agent device is a device providing for a human agent to assist the AI robot in call processing,
    wherein the method further comprises:
    obtaining an estimated service evaluation value based on the service level value, a historical service level value, and a historical service evaluation value; and
    determining that the service level value meets the first condition in response to the determination that the obtained estimated service evaluation value is less than the historical service estimation value.

2. The method according to claim 1, wherein the obtaining a service level value of the AI robot for the call based on the obtained interaction text comprises:
- determining at least one of AI complexity, service complexity, or user complexity based on the obtained interaction text, wherein the AI complexity reflects service quality of the AI robot, the service complexity reflects a complexity degree of a service, and the user complexity reflects a degree of user requirements for service handling; and
- obtaining the service level value based on the determined at least one of the AI complexity, the service complexity, or the user complexity.

3. The method according to claim 2, wherein the AI complexity is determined based on at least one of a quantity of question repetitions, a quantity of recognition failures, a questioning keyword, a user tone change, a maximum duration of question recognition, or a maximum length of a single reply;
- the service complexity is determined based on at least one of a user consultation duration, a quantity of rounds of consultation interaction, or a service level; and
- the user complexity is determined based on a quantity of times of repeated dialing for a question.

4. The call processing method according to claim 2, wherein obtaining the service level value based on the determined at least one of the AI complexity, the service complexity, or the user complexity comprises performing weighted summation on the at least one of the AI complexity, the service complexity, or the user complexity.

5. The call processing method according to claim 4, wherein performing weighted summation on the at least one of AI complexity, service complexity, or user complexity comprises:
- configuring weights of the AI complexity, the service complexity, and the user complexity; and
- performing the weighted summation using at least one of the weight of the AI complexity, the weight of the service complexity, or the weight of the user complexity.

6. The method according to claim 1,
wherein the historical service level value is a service level value of any previous call of a same service, the historical service evaluation value is a satisfaction evaluation value of any previous call of a same service, and the method further comprises:
- determining whether the estimated service evaluation value is less than the historical service evaluation value or an expected service evaluation value; and
- determining that the service level value meets the first condition in response to the determination that the estimated service evaluation value is less than the expected service evaluation value.

7. The method according to claim 1, further comprising:
- determining an overall service level value, wherein the overall service level value is an average value of service level values of the AI robot for all calls of a same service in a period;
- determining whether the service level value is less than the overall service level value or an expected service level value; and
- determining that the service level value meets the first condition in response to the determination that the service level value is less than the overall service level value or the expected service level value.

8. The method according to claim 1, wherein the performing an intervention operation on the call by using a target agent device comprises:
- sending, by the server, the obtained interaction text to the target agent device, and obtaining a corrected question text and a corrected reply text that are obtained after the target agent device corrects the interaction text; or
- transferring the call to the target agent device for processing; or
- establishing a three-party conference connection among the target agent device, the AI robot, and user equipment that initiates the call.

9. The method according to claim 8, further comprising, after the obtaining a corrected question text and a corrected reply text that are obtained after the target agent device corrects the interaction text:
- stopping the intervention operation on the call when the service level value of the AI robot for the call meets a second condition; or
- stopping the intervention operation on the call after correcting a voice recognition result of the user question.

10. The method according to claim 1, further comprising, before the performing an intervention operation on the call by using a target agent device:
- determining the target agent device based on a service corresponding to the call and subscription information, wherein the subscription information records a service to which each agent device subscribes.

11. The method according to claim 10, further comprising, after the determining the target agent device based on a service corresponding to the call and subscription information:
- adding the call to a monitoring queue of the target agent device, wherein the monitoring queue manages call information, a call monitoring status, and an interaction text of at least one call, the call information comprises a call number, calling party information, and called party information, and the call monitoring status comprises an idle state, a monitoring state, or an intervention state.

12. The method according to claim 1, wherein the first condition is set based on a service type.

13. A server, comprising at least one processor and a memory,
the memory stores a computer program, that when executed by the at least one processor, causes the server to perform operations comprising:
- monitoring, in real time, a call processing process of an artificial intelligence (AI) robot, to obtain an interaction text of a call, wherein the interaction text comprises a recognition result of a user question and a reply to the user question;
- obtaining, a service level value of the AI robot for the call based on the obtained interaction text;
- determining whether the service level value meets a first condition; and
- in response to the determination that the service level value meets the first condition, performing an intervention operation on the call by using a target agent device, wherein the target agent device is a device providing for a human agent to assist the AI robot in call processing, wherein the operations further comprise:
- obtaining an estimated service evaluation value based on the service level value, a historical service level value, and a historical service evaluation value; and determining that the service level value meets the first condition in response to the determination that the obtained estimated service evaluation value is less than the historical service estimation value.

14. The server according to claim 13, wherein the operations further comprise:
   determining at least one of AI complexity, service complexity, or user complexity based on the interaction text, wherein the AI complexity reflects service quality of the AI robot, the service complexity reflects a complexity degree of a service, and the user complexity reflects a degree of user requirements for service handling; and
   obtaining the service level value based on the determined at least one of the AI complexity, the service complexity, or the user complexity.

15. The server according to claim 14, wherein the AI complexity is determined based on at least one of a quantity of question repetitions, a quantity of recognition failures, a questioning keyword, a user tone change, a maximum duration of question recognition, or a maximum length of a single reply;
   the service complexity is determined based on at least one of a user consultation duration, a quantity of rounds of consultation interaction, or a service level; and
   the user complexity is determined based on a quantity of times of repeated dialing for a question.

16. The server according to claim 13,
   wherein the historical service level value is a service level value of any previous call of a same service, the historical service evaluation value is a satisfaction evaluation value of any previous call of a same service, and the operations further comprise:
   determining whether the estimated service evaluation value is less than the historical service evaluation value or an expected service evaluation value; and
   determining that the service level value meets the first condition in response to the determination that the estimated service evaluation value is less than the expected service evaluation value.

17. The server according to claim 13, wherein the operations further comprise:
   determining an overall service level value, wherein the overall service level value is an average value of service level values of the AI robot for all calls of a same service in a period;
   determining whether the service level value is less than the overall service level value or an expected service level value; and
   determining that the service level value meets the first condition in response to the determination that the service level value is less than the overall service level value or the expected service level value.

18. The server according to claim 13, the operations further comprise:
   sending the interaction text to the target agent device, and obtain a corrected question text and a corrected reply text that are obtained after the target agent device corrects the interaction text; or
   transferring the call to the target agent device for processing; or
   establishing a three-party conference connection among the target agent device, the AI robot, and user equipment, wherein the user equipment is a device that initiates the call.

19. The server according to claim 18, the operations further comprise:
   stopping the intervention operation on the call when the service level value of the AI robot for the call meets a second condition; or
   stopping the intervention operation on the call after correcting the recognition result of the user question.

20. The server according to claim 13, the operations further comprise:
   determining the target agent device based on a service corresponding to the call and subscription information, wherein the subscription information records a service to which each agent device subscribes.

21. The server according to claim 13, wherein the first condition is set based on a service type.

22. A call processing system comprising an artificial intelligence (AI) robot, a server, and a target agent device, wherein the AI robot is configured to process a call, and wherein the server is configured to:
   monitor a call processing process of an AI robot in real time;
   obtain an interaction text of the call, wherein the interaction text comprises a recognition result of a user question and a reply to the user question;
   obtain a service level value of the AI robot for the call based on the obtained interaction text, the service level value indicating service level of the AI robot;
   determine whether the service level value meets a first condition; and
   in response to the determination that the service level value meets the first condition, perform an intervention operation on the call by using the target agent device, wherein the target agent device is a device providing for a human agent to assist the AI robot in call processing,
   wherein the server is further configured to:
   obtain an estimated service evaluation value based on the service level value, a historical service level value, and a historical service evaluation value; and
   determine that the service level value meets the first condition in response to the determination that the obtained estimated service evaluation value is less than the historical service evaluation value.

* * * * *

UNITED STATES PATENT AND TRADEMARK OFFICE
CERTIFICATE OF CORRECTION

PATENT NO. : 11,240,374 B2
APPLICATION NO. : 16/996309
DATED : February 1, 2022
INVENTOR(S) : Mao et al.

Page 1 of 1

It is certified that error appears in the above-identified patent and that said Letters Patent is hereby corrected as shown below:

In the Claims

Claim 1, Column 20, Line 67, replace "estimation" with "evaluation"; and

Claim 13, Column 23, Line 4, replace "estimation" with "evaluation".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*